US008219315B2

(12) United States Patent
Kingaby

(10) Patent No.: US 8,219,315 B2
(45) Date of Patent: Jul. 10, 2012

(54) CUSTOMIZABLE AUDIO ALERTS IN A PERSONAL NAVIGATION DEVICE

(75) Inventor: Roger Kingaby, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 459 days.

(21) Appl. No.: 12/399,976

(22) Filed: Mar. 8, 2009

(65) Prior Publication Data
US 2010/0228479 A1 Sep. 9, 2010

(51) Int. Cl.
G01C 21/00 (2006.01)
(52) U.S. Cl. ......................................... 701/418
(58) Field of Classification Search .................. 701/200, 701/206, 207, 213, 400, 408, 410, 418, 426, 701/427, 428, 430–431, 440
See application file for complete search history.

(56) References Cited

U.S. PATENT DOCUMENTS
2009/0157509 A1* 6/2009 Little et al. ...................... 705/14
* cited by examiner Primary Examiner — Kim T Nguyen
(74) Attorney, Agent, or Firm — Winston Hsu; Scott Margo

(57) ABSTRACT

A method of creating and playing customizable audio alerts in a personal navigation device is disclosed. The method includes adding a user-customizable text message to a message field of a point of interest (POI) data structure for a POI to create an updated POI data structure, storing the updated POI data structure in a memory of the personal navigation device, receiving current position information of the personal navigation device, comparing the current position information of the personal navigation device with position coordinates associated with the updated POI data structure, and converting the text message of the updated POI data structure to speech and playing the speech through a speaker of the personal navigation device when the position comparison indicates that the personal navigation device is within a predetermined radius of the POI.

18 Claims, 3 Drawing Sheets

CUSTOMIZABLE AUDIO ALERTS IN A PERSONAL NAVIGATION DEVICE

BACKGROUND OF THE INVENTION

1. Field of the Invention

The invention relates to a personal navigation device that generates audio alerts, and more particularly, to a personal navigation device that generates customizable audio alerts when nearing a point of interest.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices are capable of issuing audio alerts to users in addition to showing an alert on a display of the personal navigation device. These alerts can include such phrases as "Turn left in 100 meters". However, personal navigation devices do not allow users to create customizable audio alerts about points of interest that are stored in the memory of the personal navigation device.

In New Zealand, a system called KRUSE has been developed for use in vehicles. The KRUSE system uses pre-recorded audio messages and GPS technology in order to play audio messages related to tourist sites or important landmarks when the vehicles approach the sites. The audio messages are useful for explaining information about sites that people might not otherwise know. However, the KRUSE system does not provide users with any way to create customizable audio alerts about points of interest, or to alter existing audio alerts to suit the individual users.

SUMMARY OF THE INVENTION

It is therefore one of the primary objectives of the claimed invention to provide a method of creating and playing customizable audio alerts in a personal navigation device for giving users the flexibility to create or modify their own customized audio alerts.

According to an exemplary embodiment of the claimed invention, a method of creating and playing customizable audio alerts in a personal navigation device is disclosed. The method includes adding a user-customizable text message to a message field of a point of interest (POI) data structure for a POI to create an updated POI data structure, storing the updated POI data structure in a memory of the personal navigation device, receiving current position information of the personal navigation device, comparing the current position information of the personal navigation device with position coordinates associated with the updated POI data structure, and converting the text message of the updated POI data structure to speech and playing the speech through a speaker of the personal navigation device when the position comparison indicates that the personal navigation device is within a predetermined radius of the POI.

According to another exemplary embodiment of the claimed invention, a personal navigation device for playing customizable audio alerts for a point of interest (POI) is disclosed. The personal navigation device includes a memory for storing at least one POI data structure containing a user-customizable text message in a message field of the POI data structure, a global positioning system (GPS) receiver for receiving current position information of the personal navigation device, a speaker for outputting audio signals, a text to speech (TTS) circuit for converting the text message stored in the message field of the POI data structure into speech, and a processor for controlling the personal navigation device, comparing the current position information of the personal navigation device with position coordinates associated with the POI data structure, detecting when the personal navigation device is within a predetermined radius of the POI, and controlling the TTS circuit to play the speech through the speaker when the personal navigation device is within the predetermined radius of the POI.

It is an advantage that users can create customizable audio alerts, or can modify existing audio alerts, for points of interest quickly and easily. It is another advantage that the personal navigation device has a text to speech for allowing alerts to be stored in the form of a text message. The text messages can be read out as speech, thereby offering the user the chance to hear an audio message while at the same time requiring minimal storage space for storing the text message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
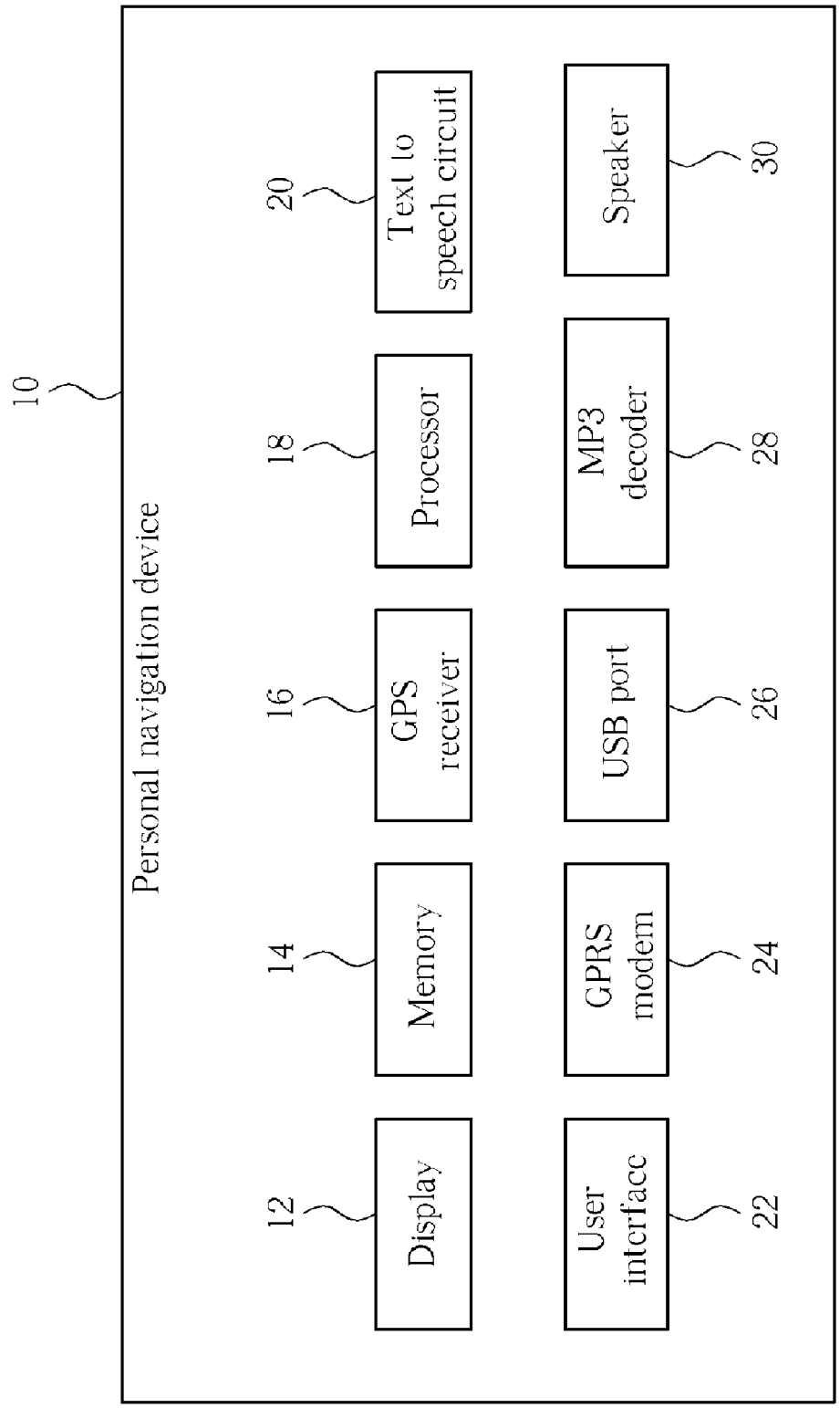
FIG. 1 is a block diagram of a personal navigation device according to the present invention.

Please refer to FIG. 1. FIG. 1 is a block diagram of a personal navigation device 10 according to the present invention. The personal navigation device 10 contains a display 12, a memory 14, a GPS receiver 16, a processor 18, a text to speech circuit 20, a user interface 22, a General Packet Radio Service (GPRS) modem 24, a Universal Serial Bus (USB) port 26, a Moving Picture Experts Group Layer-3 (MP3) decoder 28, and a speaker 30. Further description of the personal navigation device 10 will be given below.

Figure 2:
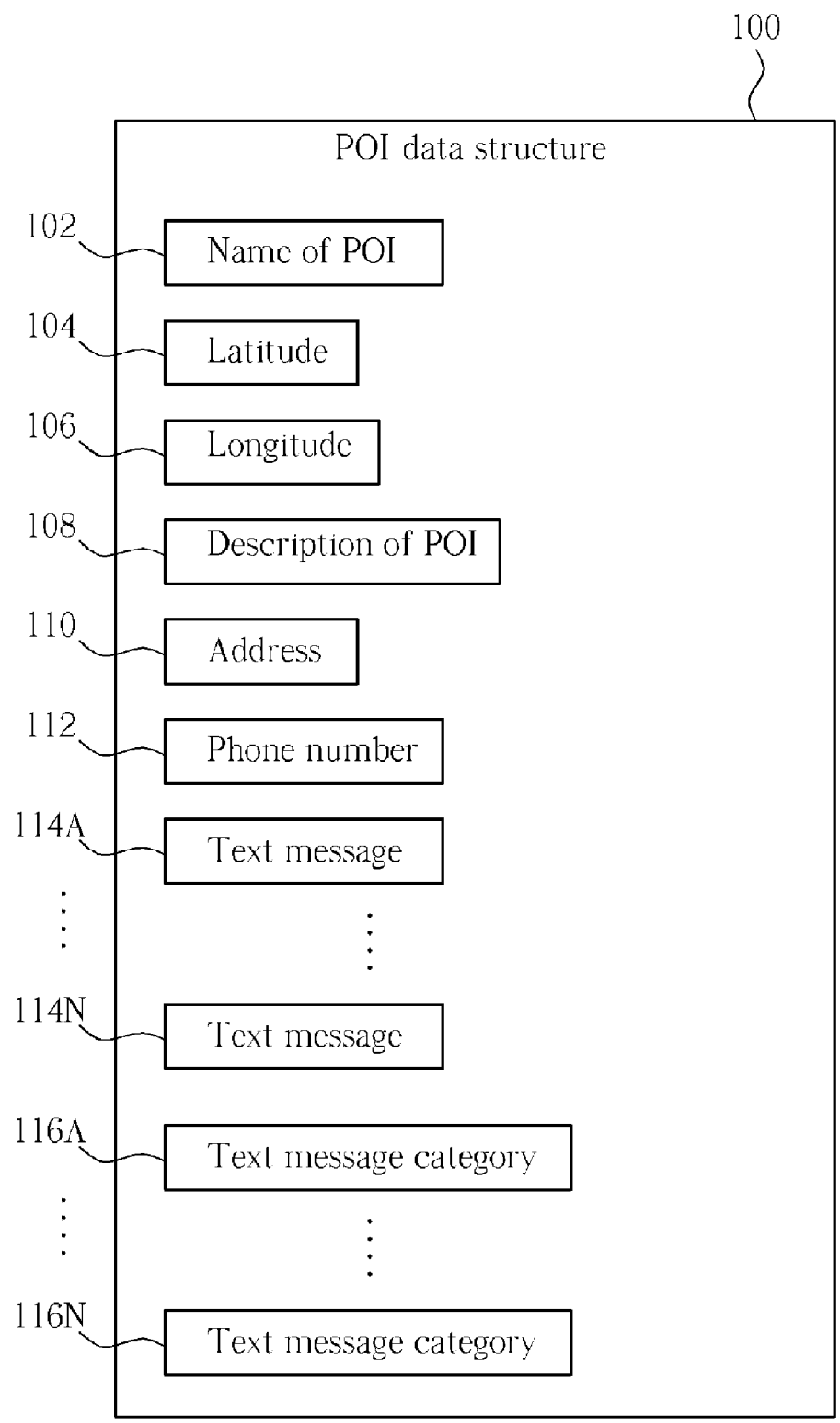
FIG. 2 is a block diagram of a POI data structure according to the present invention.

The memory 14 is used to store maps and points of interest. Preferably each point of interest (POI) is stored in a data structure written in the eXtensible Markup Language (XML) format due to its open nature, although any format can be used. Please refer to FIG. 2. FIG. 2 is a block diagram of a POI data structure 100 according to the present invention. The POI data structure 100 comprises a field 102 indicating the name of the POI, a field 104 indicating the latitude of the POI, a field 106 indicating the longitude of the POI, a field 108 giving a general description of the POI, a field 110 giving an address of the POI, a field 112 giving a phone number of the POI, and a field containing one or more customizable text messages 114A-114N associated with the POI, and a field containing one or more text message categories 116A-116N corresponding to the text messages 114A-114N. Please note that the fields of the POI data structure 100 shown in FIG. 2 are not limiting, and are intended to serve as examples only. Some of these fields are optional, and additional fields can be used as well.

If only one text message 114A is used, then the field containing the text message categories 116A-116N is optional. However, by utilizing multiple text messages 114A-114N and corresponding multiple text message categories 116A-116N, the user may create text messages that are only to be used in certain situations. For example, suppose text message category 116A represents a "business" category, and text message 114A gives information relating to the user's business dealings, such as the name or address of a business contact that is located near the POI indicated by the POI data structure 100. Text messages could be stored for other categories as well, such as "recreation" or "travel".

The present invention utilizes the text messages 114A-114N field of the POI data structure 100 for allowing users to create customizable alerts. The users can add text to one or more of the text messages 114A-114N or edit existing text that corresponds to a POI. When no text message categories 116A-116N are specified and there is only a single text message 114A, this text message 114A will be read once the personal navigation device 10 is within a predetermined radius of the POI. At this time, the text to speech circuit 20 converts the text contained in the text message 114A to speech, and outputs the speech through the speaker 30. In this way, the user can be presented with a customizable audio alert when approaching the POI. If one or more text message categories 116A-116N are specified, then the personal navigation device 10 must first determine what type of route the user is traveling on, such as business or recreation. The route type can either be specified directly by the user, or can be guessed by the personal navigation device 10 according to the starting point, destination point, or way points of the route. Once the route type that the user is currently traveling on has been established, a text message 114A-114N associated with the corresponding text message category 116A-116N is read by the text to speech circuit 20 and output as speech through the speaker 30.

Figure 3:
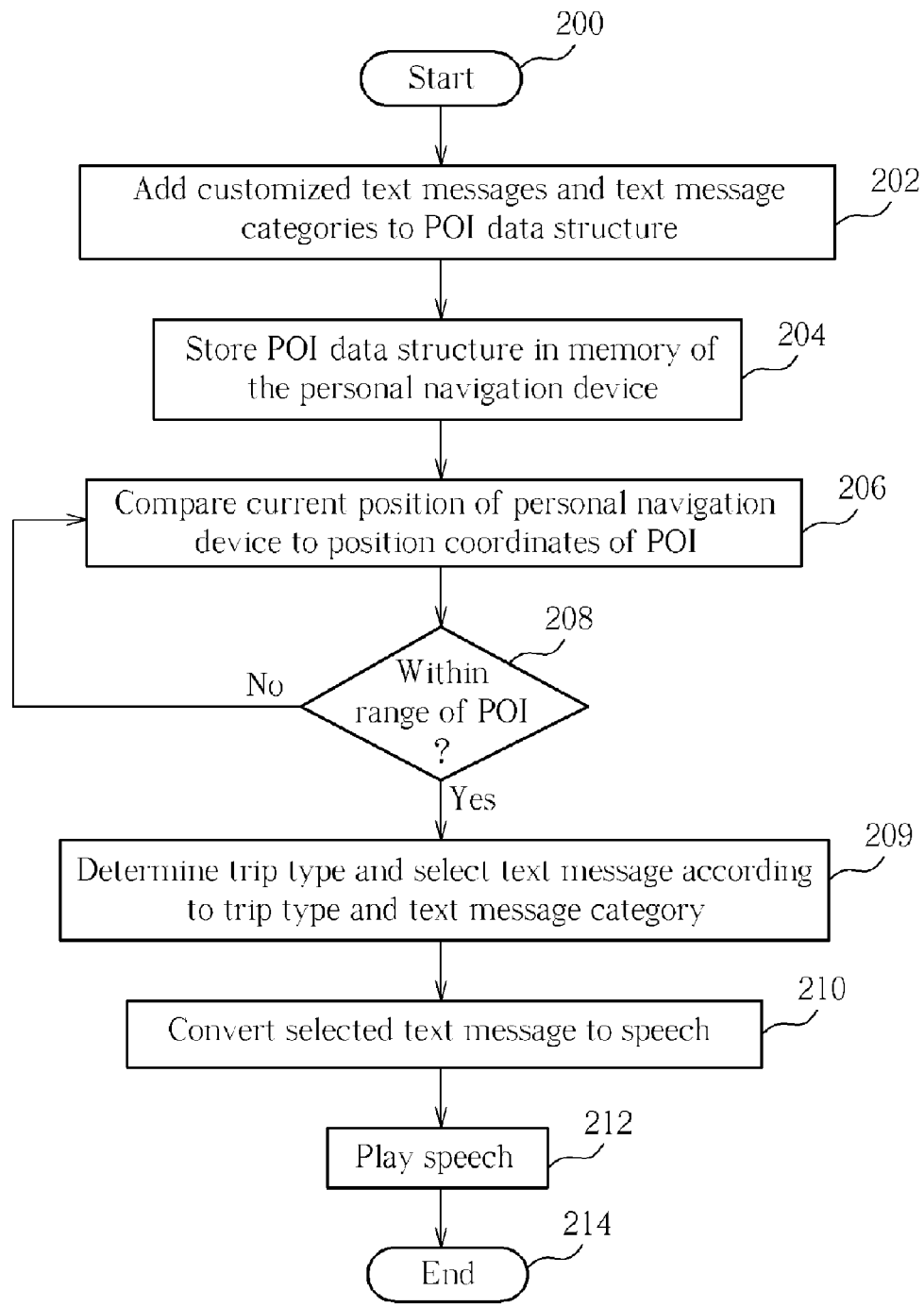
FIG. 3 is a flowchart illustrating a method of creating and playing customizable audio alerts in the personal navigation device according to the present invention.

Please refer to FIG. 3. FIG. 3 is a flowchart illustrating a method of creating and playing customizable audio alerts in the personal navigation device 10 according to the present invention. Steps contained in the flowchart will be explained below.

The flowchart starts with step 200, and is immediately followed by step 202, in which the user adds one or more text messages 114A-114N to the POI data structure 100, or edits an existing text message 114A-114N of the POI data structure 100. Text message categories 116A-116N can also be added at this time. There are many possible ways that the user of the personal navigation device 10 can add or edit the text messages 114A-114N. For instance, the user can use the user interface 22 of the personal navigation device 10 for adding or editing the text messages 114A-114N directly. Use of the user interface 22 is likely best used for writing a small quantity of text.

Other faster methods of adding text message 114A-114N to the POI data structure 100 include downloading an online library of POI data structures 100 from a manufacturer's website, a travel information website, or other such source. By downloading POI data structures 100 already containing text messages 114A-114N, users can save a tremendous amount of time and have access to more information than they may have had otherwise. Due to the potentially large numbers of POI data structures 100 available for download, the user may be given the choice of downloading all POI data structures 100 or only a selected group of them. For instance, a user can download POI data structures 100 located within a particular geographical area or POI data structures 100 associated with particular types of POIs such as restaurants. The number of POI data structures 100 that the personal navigation device 10 is limited only by the size of the memory 14. Fortunately, the use of text messages 114A-114N and text message categories 116A-116N in conjunction with the text to speech circuit 20 allows for a small data size for each POI data structure 100 since text is stored instead of an audio file.

Users can also use computers to add text messages 114A-114N to the POI data structures 100. Users can either type the information into the text messages 114A-114N themselves, or they can download the information from the internet, such as from the website Wikipedia. The personal navigation device 10 can be connected to the computer through the USB port 26 for transferring the POI data structures 100 to the memory 14 of the personal navigation device 10. Alternatively, users may utilize the GPRS modem 24 to access the internet directly through the personal navigation device 10 and copy information from the internet into text messages 114A-114N.

Returning to the flowchart of FIG. 3, after the text messages 114A-114N and text message categories 116A-116N are added to the POI data structures 100, the POI data structures 100 are stored in the memory 14 of the personal navigation device 10 in step 204. Typically, the POI data structures 100 are not utilized until the personal navigation device 10 is within a predetermined radius of a particular POI.

In step 206, the GPS receiver 16 receives the current position of the personal navigation device 10, and the processor 18 compares the current position to the position coordinates of POIs stored in the memory 14. The processor 18 then determines if there are any POIs within the predetermined radius of the personal navigation device 10 in step 208. When there are no POIs within range, the personal navigation device 10 keeps comparing position information in step 206. On the other hand, when there is a POI within the predetermined radius of the personal navigation device 10, steps 209 through 214 are executed. In step 209, the trip type or route type that the user is currently on is determined. Then the correct text message 114A-114N is selected by comparing the current route type to the text message categories 116A-116N. Then the selected text message 114A-114N is read by the text to speech circuit 20 and converted into speech signals in step 210. The speech signals are played through the speaker 30 in step 212, and the method ends in the subsequent step 214.

The POI data structure 100 can optionally be associated with one or more audio files stored in the memory 14. These audio files may be Moving Picture Experts Group Layer-3 (MP3) audio files or other such compressed audio files in order to conserve space in the memory 14. Like the speech corresponding to the text messages 114A-114N, the audio files may also be played when nearing a POI. The audio files can be played instead of or in addition to the speech corresponding to the text message 114A-114N. An example of this feature could be using a song that is associated with a particular place as background music while the speech corresponding to the text message 114A-114N is played.

The present invention has many potentially useful applications. In addition to telling users about recreational data such as historic landmarks or tourist destinations, the text messages 114A-114N can also be used to store the name and phone number of a business associate or a customer who works at an office building. When the user of the personal navigation device 10 approaches the office building, the user will hear an audio alert informing the user of the personal navigation device 10 of the name and phone number of the business associate so as to refresh the user's memory.

The potential uses for the text stored in the text messages 114A-114N of the POI data structures 100 are limitless, and by converting the text messages 114A-114N to speech, the user of the personal navigation device 10 can safely keep his eyes on the road instead of having to look down to the display 12 of the personal navigation device 10.

Those skilled in the art will readily observe that numerous modifications and alterations of the device and method may be made while retaining the teachings of the invention.

What is claimed is:

1. A method of creating and playing customizable audio alerts in a personal navigation device, the method comprising:
   adding, by a user of the personal navigation device via the personal navigation device, a user-customizable text message to a message field of a point of interest (POI) data structure for a POI to create an updated POI data structure, the message field of the POI data structure comprising a plurality of text messages, the POI data structure further comprising a text message category field comprising a plurality of text message categories, each of the plurality of text messages having a corresponding text message category for indicating a content type of the text message;
   storing the updated POI data structure in a memory of the personal navigation device;
   receiving current position information of the personal navigation device;
   comparing the current position information of the personal navigation device with position coordinates associated with the updated POI data structure; and
   converting the text message of the updated POI data structure to speech and playing the speech through a speaker of the personal navigation device when the position comparison indicates that the personal navigation device is within a predetermined radius of the POI.

2. The method of claim 1 further comprising downloading an online library of updated POI data structures already containing text messages onto the personal navigation device.

3. The method of claim 2, wherein downloading the online library comprises downloading an entire online library of updated POI data structures.

4. The method of claim 2, wherein downloading the online library comprises downloading updated POI data structures corresponding to a specific geographical location.

5. The method of claim 1 further comprising editing the text message directly through the personal navigation device.

6. The method of claim 1 further comprising:
   specifying, by the user, a route type for a current route that the personal navigation device is traveling on;
   selecting a text message having a corresponding text message category matching the route type for the current trip; and
   converting the selected text message of the updated POI data structure to speech and playing the speech through a speaker of the personal navigation device when the position comparison indicates that the personal navigation device is within a predetermined radius of the POI.

7. The method of claim 1 further comprising:
   associating an audio file with the updated POI data structure; and
   playing the audio file in addition to playing the speech associated with the text message when the position comparison indicates that the personal navigation device is within the predetermined radius of the POI.

8. The method of claim 7, wherein the audio file is a Moving Picture Experts Group Layer-3 (MP3) audio file.

9. The method of claim 1, wherein the POI data structure and the updated POI data structure are in an eXtensible Markup Language (XML) format.

10. A personal navigation device for playing customizable audio alerts for a point of interest (POI), comprising:
    a memory for storing at least one POI data structure containing a user-customizable text message, created by a user of the personal navigation device via the personal navigation device, in a message field of the POI data structure, the message field of the POI data structure comprising a plurality of text messages, the POI data structure further comprising a text message category field comprising a plurality of text message categories, each of the plurality of text messages having a corresponding text message category for indicating a content type of the text message;
    a global positioning system (GPS) receiver for receiving current position information of the personal navigation device;
    a speaker for outputting audio signals;
    a text to speech (TTS) circuit for converting the text message stored in the message field of the POI data structure into speech; and
    a processor for controlling the personal navigation device, comparing the current position information of the personal navigation device with position coordinates associated with the POI data structure, detecting when the personal navigation device is within a predetermined radius of the POI, and controlling the TTS circuit to play the speech through the speaker when the personal navigation device is within the predetermined radius of the POI.

11. The personal navigation device of claim 10 further comprising an internet connection device for connecting to the internet and downloading an online library of POI data structures already containing text messages onto the personal navigation device.

12. The personal navigation device of claim 11, wherein downloading the online library comprises downloading an entire online library of POI data structures.

13. The personal navigation device of claim 11, wherein downloading the online library comprises downloading POI data structures corresponding to a specific geographical location.

14. The personal navigation device of claim 10 further comprising a user interface for editing the text message directly through the personal navigation device.

15. The personal navigation device of claim 10 wherein when a user specifies a route type for a current route that the personal navigation device is traveling on, the processor selects a text message having a corresponding text message category matching the route type for the current trip, converts the selected text message of the updated POI data structure to speech, and plays the speech through a speaker of the personal navigation device when the position comparison indicates that the personal navigation device is within a predetermined radius of the POI.

16. The personal navigation device of claim 10 further comprising an audio decoder for playing an audio file associated with the POI data structure in addition to playing the speech associated with the text message when the processor indicates that the personal navigation device is within the predetermined radius of the POI.

17. The method of claim 16, wherein the audio decoder is a Moving Picture Experts Group Layer-3 (MP3) decoder and the audio file is an MP3 file.

18. The personal navigation device of claim 10, wherein the POI data structure and the POI data structure are in an eXtensible Markup Language (XML) format.

* * * * *